UNITED STATES PATENT OFFICE.

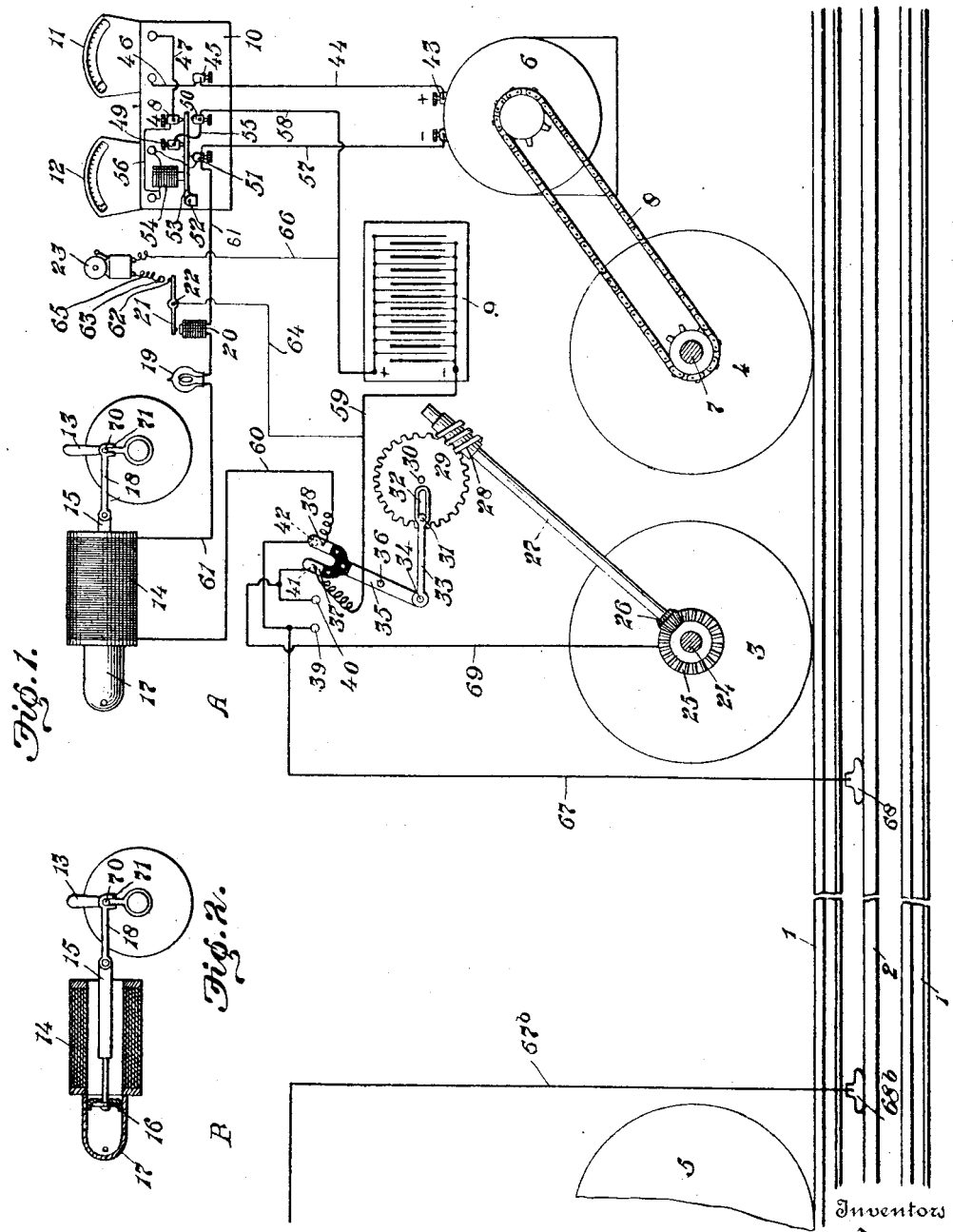

JOHN H. SANOR AND ELIAS W. CONKELL, OF CANTON, OHIO; SAID CONKELL ASSIGNOR TO SAID SANOR.

ELECTRIC SIGNAL AND TRAIN CONTROL.

1,039,324.   Specification of Letters Patent.   Patented Sept. 24, 1912.

Application filed November 27, 1911. Serial No. 662,587.

*To all whom it may concern:*

Be it known that we, JOHN H. SANOR and ELIAS W. CONKELL, citizens of the United States, residing at Canton, in the county of Stark and State of Ohio, have jointly invented a new and useful Improvement in Electric Signals and Train Controls, of which the following is a specification.

Our invention relates to improvements in devices for electric signals between and controlling vehicles on railways and for preventing collision between said vehicles.

The objects of the invention are to provide means whereby proper signals can be given to those operating vehicles approaching each other upon the same track or following each other upon the same track within predetermined distances.

A further object of the invention is to provide means for automatically actuating the air brakes when vehicles approach each other upon the same track within a predetermined distance or when one vehicle follows another within a predetermined distance, the device being adapted to operate regardless of the direction in which the vehicle or vehicles are moving.

These objects, together with other objects apparent to those skilled in the art may be attained by the construction illustrated in the accompanying drawings, although the invention may be embodied in other forms, the construction illustrated being chosen by way of example.

In the present invention each vehicle from which signal or control-actuating currents emanate or whereon a signal and controlling apparatus are to be actuated, should be provided with what will hereinafter be termed a unit, comprising both means for producing and emanating electric current, and means for receiving and utilizing the same in the operation of a signal and controlling device.

In the drawing, Figure 1 is a diagrammatic view of a railway on which is mounted one complete vehicle and unit and also a fragmentary portion of a second vehicle and unit. Fig. 2 is a sectional view through the air brake lever actuating solenoid and dashpot connected thereto.

Throughout the drawing similar reference numerals indicate similar parts.

The numerals 1—1 indicate the two rails of the railway. The numeral 2 indicates a third rail or trolley which may be located between the railway rails as shown or suspended overhead, as may be desired.

The letter A represents generally a vehicle on the rails equipped with a complete unit and the letter B a similar vehicle equipped with a similar unit, the greater portion of the apparatus of B being omitted.

The numerals 3 and 4 indicate wheels of the vehicle A mounted upon the rails 1. The numeral 5 indicates one of the wheels of the vehicle B mounted upon the same rails.

Attention is now directed to the apparatus constituting the unit on the vehicle A.

The numeral 6 indicates a direct current electric generator. Said generator is operatively connected to the axle 7 of the wheel 4 by means of the sprocket chain 8 or its equivalent.

The numeral 9 indicates a storage battery of any well known design.

The numeral 10 indicates a base or suitable support upon which is mounted an ammeter 11 and a voltmeter 12.

13 indicates the air brake lever.

14 indicates a solenoid, provided internally with the armature 15, adapted for longitudinal movement within said solenoid and connected to the piston 16 within the dashpot 17, to limit the rapidity of movement of the armature. The rod 18 operatively connects the armature 15 with the lever 13.

19 indicates an electric lamp or its equivalent visible signal.

20 is an electromagnet of which the lever 21 pivoted at 22 is the armature.

23 is an electric bell or other audible electric signal.

On the axle 24 of the wheel 3 is a beveled gear 25 meshing with the beveled gear 26 mounted on the lower end of the shaft 27, upon the upper end of which is mounted the worm gear 28 meshing with the gear 29. Said gear 29 is journaled at 30 to any suitable support and is provided on its face with a wrist pin 31 arranged in the longitudinal slot 32 of the pitman 33, which is pivotally connected at 34 to one end of the current-reversing lever 35, which is pivotally connected at 36 to any fixed support. The other end of said current-reversing lever is provided with two spaced, insulated contact fingers 37 and 38 respectively, adapted for engagement with the forward stationary contacts 39 and 40, when said contact fingers are in their most extreme forward position and adapted for contact with the rear stationary contacts 41 and 42 when said fingers are in their rearmost position.

From the positive binding post 43 on the generator 6 the wire 44 leads to the binding post 45 on the base 10 whence the wire 46 conducts the current into the ammeter 11 from which the wire 47 continuing the circuit, leads to the binding post 48, provided with a downwardly disposed contact point. Said binding post 48 is mounted upon the base 10 as is also the binding post 49 provided with a similar downwardly disposed contact point. Below the binding posts 48 and 49 and spaced therefrom are the binding posts 50 and 51 provided with upwardly disposed contact points.

Pivotally connected at 52 to a suitable support mounted upon the base 10 is the armature 53 which is in the form of a lever and extends intermediate the upper pair of binding posts 48 and 49 and the lower pair of binding posts 50 and 51. Said armature is limited in its pivotal movement downwardly by the upwardly disposed contact points of the lower pair of binding posts and when in contact with said contact points is adapted to close the circuit from said post 50 to said post 51. In a similar manner said armature is limited in its upward movement by the contact points of the posts 48 and 49 and when in contact with said points is adapted to close a circuit between said upper posts. The electromagnet 54 is mounted upon the base 10 and adapted, when energized, to lift the armature 53 into its upper position, said armature being normally adapted to fall by gravity into its lower position.

Taking up further the circuit hereinbefore traced, the same leads from the binding post 48 through the armature 53 to the binding post 49 and thence through the wire 55 to the binding post 50. From the binding post 48 the wire 56 shunts a small portion of the current through the voltmeter 12 and the magnet 54, thence leading to the binding post 51 and back to the generator 6 by means of the wire 57.

It will be understood that only a small fraction of the current will pass through the voltmeter 12 and magnet 54, in fact only sufficient current for properly measuring the voltage and energizing said magnet to hold the armature 53 in its upper position. So long as said fraction of the current is so shunted the greater portion of the said current will pass on from the binding post 50 through the wire 58 into the storage battery 9. From the negative side of the storage battery the wire 59 leads to the contact finger 37 on the current-reversing lever 35. The finger 38 of the current-reversing lever is connected to the wire 60 which leads directly to the solenoid 14 and thence the wire 61 leads through the lamp 19, magnet 20 and back to the binding post 51.

The lever 21, constituting the armature of the magnet 20 is provided with a contact point 62 adapted to be brought into contact with the fixed contact point 63 when the magnet 20 actuates the lever 21 by drawing downwardly upon the end of said lever opposite the contact 62. From the lever 21 the wire 64 leads to the wire 61. The fixed contact point 63 is connected to one binding post of the bell 23 by the wire 65 and the wire 66 connects the other binding post of said bell with the wire 58. It will be understood that when the magnet 20 actuates the lever 21 to close the circuit through the bell 23 by placing the point 62 in contact with the point 63 a circuit will be shunted through the bell 23 to actuate the same.

The apparatus and wiring having been arranged as described, it will be readily seen that the contact fingers 37 and 38 constitute the separate terminals of the main circuit and that if connection were made between the said fingers the circuit would be complete from the generator through the ammeter, thence through the storage battery (minor current being shunted through the voltmeter and magnet 54) thence through the battery at 9 and back through the solenoid 14, lamp 19, coil 20 and thence to the generator.

The stationary contacts 40 and 41 are grounded upon the vehicle A, as for instance by a wire 69 leading to the axle 24. The stationary contacts 39 and 42 are connected, as by means of the wire 67 with a shoe 68 which forms a sliding contact with the trolley 2. It will be understood that the said shoe 68 may be of any appropriate form, such as a trolley wheel or a contact brush of well known construction. When the fingers 37 and 38 on the current reversing lever 35 are in their rearmost position, as shown on vehicle A in Fig. 1, it will be noted that the positive side of the main circuit of the unit will be connected through the wire 69 and wheels of the vehicle, with the rails 1, whereas the negative side of the circuit will be connected through the wire 67 and shoe 68 with the trolley 2.

From the mechanism hereinbefore described it will be understood that as the vehicle A moves frontwardly or backwardly the shaft 27 will be rotated, whereby, through the intermediate mechanism, the circuit reversing lever 35 will be oscillated to throw the fingers 37 and 38 from engagement with the contacts 41 and 42 into engagement with the contacts 39 and 40 respectively, then back again into engagement with contacts 41 and 42, and so on, so long as the vehicle is moving frontwardly or backwardly. The connecting mechanism between the axle 24 and the circuit-reversing lever 35 should be so arranged as to thus shift the said circuit-reversing lever once for every predetermined unit of distance traversed by the vehicle. Such unit of distance may of course vary as circumstances require, but under ordinary conditions I prefer to so arrange the mechanism as to oscillate the circuit-reversing lever for each 200 to 400 feet traveled by the vehicle. In the case of fast moving vehicles, this distance should be greater than in the case of slower moving vehicles.

From the above description it will be noted that by means of the circuit-reversing lever the wires 59 and 60 are being constantly shifted into contact with the rails 1 and trolley 2, each movement of the lever 35 changing the polarity of the shoe 68 from positive to negative or from negative to positive as the case may be, and correspondingly changing the polarity of the current in the wire 69 connected through the wheels with the rails of the track. The circuit through the voltmeter and magnet 54 is, however, normally closed, so as to maintain the armature 53 in the upward position illustrated in the drawings. If, for any reason, the circuit from the generator 6 should be interrupted the magnet 54 will be no longer energized, thus permitting the armature 53 to drop by gravity closing circuit between the posts 50 and 51, thus cutting out the generator and closing a more direct circuit through the storage battery 9. In case the generator 6 is operating and the circuit is completed through a unit it will be noted that the battery 9 is connected in series in the main circuit and the entire current will pass therethrough as will be well understood by those skilled in the art. Any surplus current will be stored in the battery 9, and when by accident or otherwise the generator 6 discontinues to furnish current and contact is made between the posts 50 and 51 by the falling armature 53 the battery 9 will take up the work of providing current for actuating the apparatus.

So long as but one vehicle provided with such a unit as described is mounted upon the track the circuit through the apparatus of said unit will at no time be closed because of the fact that the trolley is normally insulated from the rails 1. Let it be supposed, however, that a second vehicle, such as B in the drawing is also located upon the same track as the vehicle A and within the predetermined signaling distance. Let it be presumed further that the vehicle A is moving while the vehicle B is at rest. In such case the polarity of the shoe 68ᵇ of the vehicle B will be fixed, that is it will be either positive or negative and not constantly changing as would be the case if the vehicle B were in motion. As the vehicle A approaches the vehicle B the circuit-reversing lever 35, reversing the polarity of the shoe 68 of the vehicle A will intermittently so change the polarity of said shoe 68 as to be opposite the polarity of the shoe 68ᵇ. In such instance a circuit will be closed from the shoe 68 through the trolley 2, shoe 68ᵇ and the electrical apparatus of vehicle B, through the wheel 5 of vehicle B, rails 1 and wheels of the vehicle A, as will be understood from the above description. Immediately when said circuit is closed the lamp 19, will be lighted, the magnet 20 will be energized so as to throw into circuit the bell 23, and the operator of the vehicle will thus be apprised of the fact that he is within signaling distance of a second vehicle. As the distance between the vehicles is lessened the resistance of the rails 1 and trolley 2 will be equally lessened, thus increasing the brilliancy of the light from the lamp and thus warning the operator that he is approaching the other vehicle. The solenoid 14, it should be stated, is so constructed that when a weak current passes therethrough no appreciable action upon the armature 15 will be effected. When, however, the current through the solenoid 14 reaches a certain predetermined strength the armature 15 will be drawn inwardly, thus throwing the lever 13 to apply the air brakes. It will be understood that as the distance between the vehicles A and B is lessened the current passing through the solenoid 14 becomes stronger and the armature will not be actuated instantly but in a gradual manner by reason of the gradually increasing current through said solenoid. To especially provide against any unduly sudden movement of the lever 13 the dashpot 17 is provided and the piston 16 connected to the armature 15 is arranged within said dashpot. As will be readily understood by those skilled in the art this construction will accomplish the above mentioned objects. In case both the vehicles A and B are in motion the results will be substantially the same but in such case the polarity of the shoe 68ᵇ will also be intermittently changed similarly to that of the shoe 68. In such case therefore the signal and controlling apparatus on both vehicles will be actuated at such times as the polarity of one of the said shoes is opposite the polarity of the other shoe.

It will be obvious that it makes no difference in the operation of the above described signal and control whether the vehicles A and B are traveling in the same direction, the one following the other, or are approaching each other from opposite directions. So long as the distance between the vehicles is sufficiently great the resistance of the rails 1 and the trolley 2 prevent signal or control currents passing from one unit to the other, but as the distance becomes less and the resistance of the rails and trolley is decreased to a predetermined extent sufficient current will pass from one unit to the other and through both units to actuate the signaling device and controls hereinbefore described. Inasmuch as the polarity of the shoes 68 and 68ᵇ are intermittently changed from positive to negative and negative to positive no speci. adjustment of units is necessary in order that the same may complement each other in producing the required signal and control effects. The invention therefore provides a simple and practical system relatively inexpensive both in first cost and maintenance.

While we have described the invention as applied to two vehicles only, it will be understood that if three or more vehicles provided with units of the character described approach each other sufficiently closely to permit the operation of the signal and control device thereon, reference being had to the strength of current used and resistance in the rails or trolley, that the apparatus on each of said vehicles will be actuated as hereinbefore described in the case of two vehicles; thus effectually preventing collision regardless of the number of vehicles within the danger zone.

The description above given, it will be understood, refers to the more normal and usual operations of the device in signaling between and controlling two or more vehicles. We desire to point out, however, that an approaching vehicle may be signaled and controlled without the use of a second unit, by merely short-circuiting one of the rails 1 with the trolley 2. This can readily be accomplished, by the track-walker for instance upon discovering a wash-out or the like, by merely connecting the trolley to one of the rails by a bar of suitable metal or a special emergency connecting device such as a wire carried by said track-walker for the purpose.

In constructing the railway whereon the hereinbefore described signal and control system is to be used it is desirable that the rails 1 form a continuous conductor. If the rail joints of ordinary construction do not sufficiently bind the rails to form a complete circuit the ends of adjacent rails may be bonded at the joints in the manner well known to those skilled in the art, in order to produce a more perfect and complete circuit. It will of course be understood that the trolley 2 should be also continuous, so that the device may operate at any point along the entire railway, under the necessary operating conditions.

For the purpose of disconnecting the rod 18 from the air brake lever 13, said rod 18 is connected to said lever by means of the hook portion 71 removably engaging the pin 70 on said lever. When the solenoid 14 has operated to draw the lever 13 forward, should it be desired to release said lever from control of said solenoid the rod 18 may be lifted or swung upwardly, thus disconnecting the hook portion 71 from the pin 70 and freeing the lever 13.

We claim—

1. In combination with a track formed of continuous, conducting rails, a continuous trolley paralleling said tracks and a railway vehicle provided with air-brakes mounted on said rails; a signal and control unit mounted upon said vehicle and comprising an electrically actuated air-brake-applying device, an electrically operated visible signal, an electrically operated audible signal, a signal-switch, a signal-switch magnet, a generator, a generator-switch armature, a storage battery, a polarity reverser, a main circuit having one terminal connected to said polarity reverser and including in series said air-brake-applying device, visible signal, signal-switch magnet, generator, generator-switch armature, and storage battery, and having its other terminal connected to said polarity reverser, electrical connection between said polarity reverser and said trolley, and between said polarity reverser and said rails, a circuit shunted across said main circuit and including said signal-switch and audible signal, said signal-switch adapted to be operated by said signal-switch magnet, a generator-switch armature operating magnet, a circuit shunted across said main circuit intermediate said generator and other apparatus mentioned and including said generator-switch armature-operating magnet, said generator-switch armature adapted to cut said generator in and out of said main circuit, mechanical means operatively connecting said generator with the wheels of said vehicle, mechanical means operatively connecting said polarity reverser with the wheels of said vehicle and said polarity reverser adapted to reverse the terminals of said main circuit with respect to said electrical connection between said polarity reverser and said rails and between said polarity reverser and said trolley, respectively.

2. In combination with a track formed of continuous, conducting rails, a continuous trolley paralleling said track and a railway vehicle provided with air-brakes mounted on said rails; a signal and control unit mounted upon said vehicle and comprising an electrically actuated air-brake-applying device, an electrically operated signal, a generator, a generator-switch, a storage battery, a polarity reverser, a main circuit having one terminal connected to said polarity reverser and including in series said air-brake-applying device, signal, generator, generator-switch and storage battery and having its other terminal connected to said polarity reverser, electrical connection between said polarity reverser and said trolley and between said polarity reverser and said rails, a generator-switch operating magnet, a circuit shunted across said main circuit intermediate said generator and other apparatus mentioned and including said generator-switch operating magnet, said generator-switch adapted to cut said generator in and out of said main circuit, mechanical means operatively connecting said generator with the wheels of said vehicle, mechanical means operatively connecting said polarity reverser with the wheels of said vehicle and said polarity reverser adapted to reverse the terminals of said main circuit with respect to said electrical connection between said polarity reverser and said rails and between said polarity reverser and said trolley, respectively.

In testimony that we claim the above, we have hereunto subscribed our names in the presence of two witnesses.

JOHN H. SANOR.
ELIAS W. CONKELL.

Witnesses:
JOHN H. BISHOP,
WILLIAM H. MILLER.